Dec. 24, 1968    R. W. SLATER ET AL    3,417,765
TELESCOPING AND LONGITUDINALLY ADJUSTABLE CRUTCH
Filed Sept. 14, 1967    2 Sheets-Sheet 1
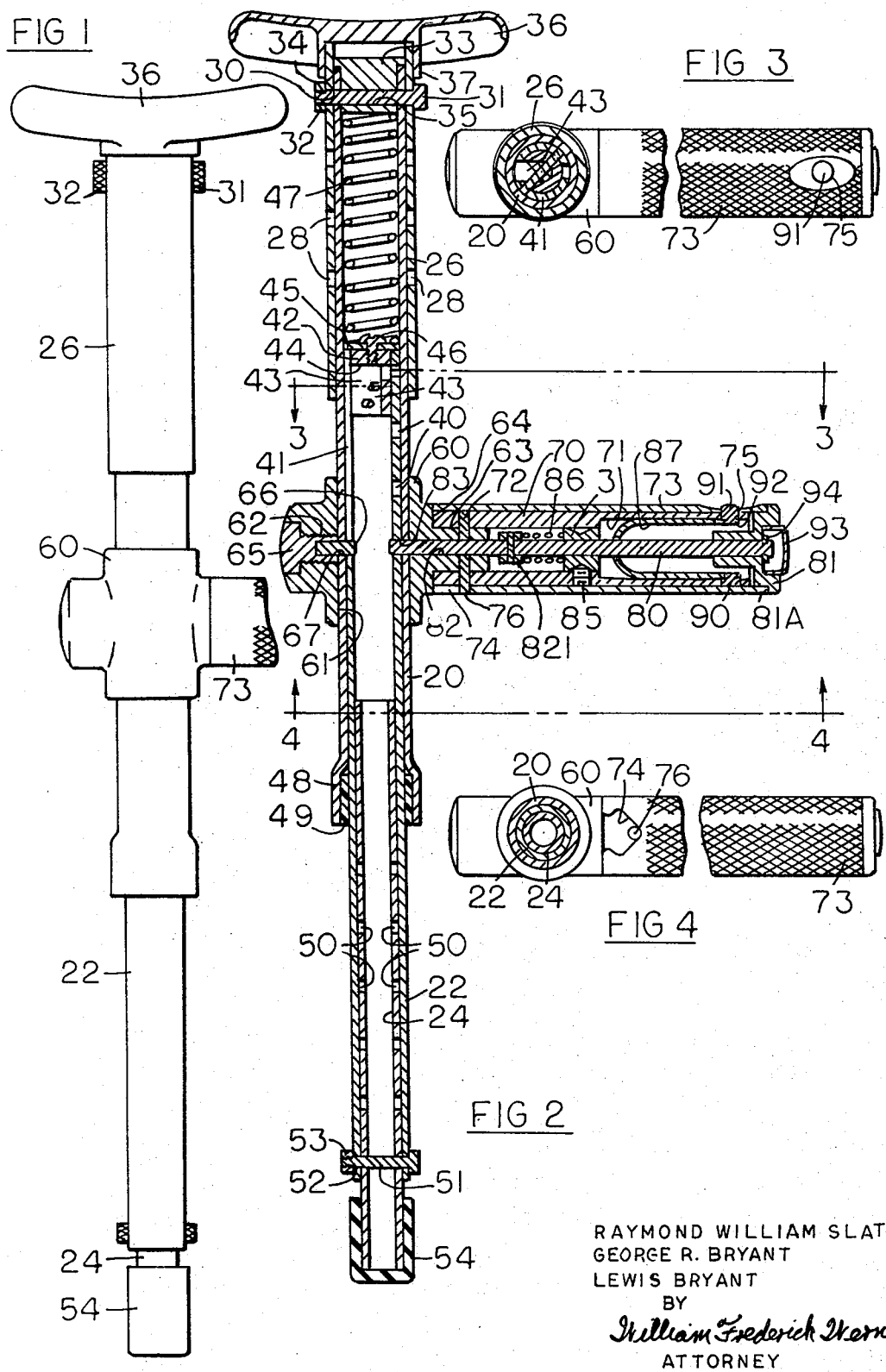
RAYMOND WILLIAM SLATER
GEORGE R. BRYANT
LEWIS BRYANT
BY
William Frederick Werner
ATTORNEY

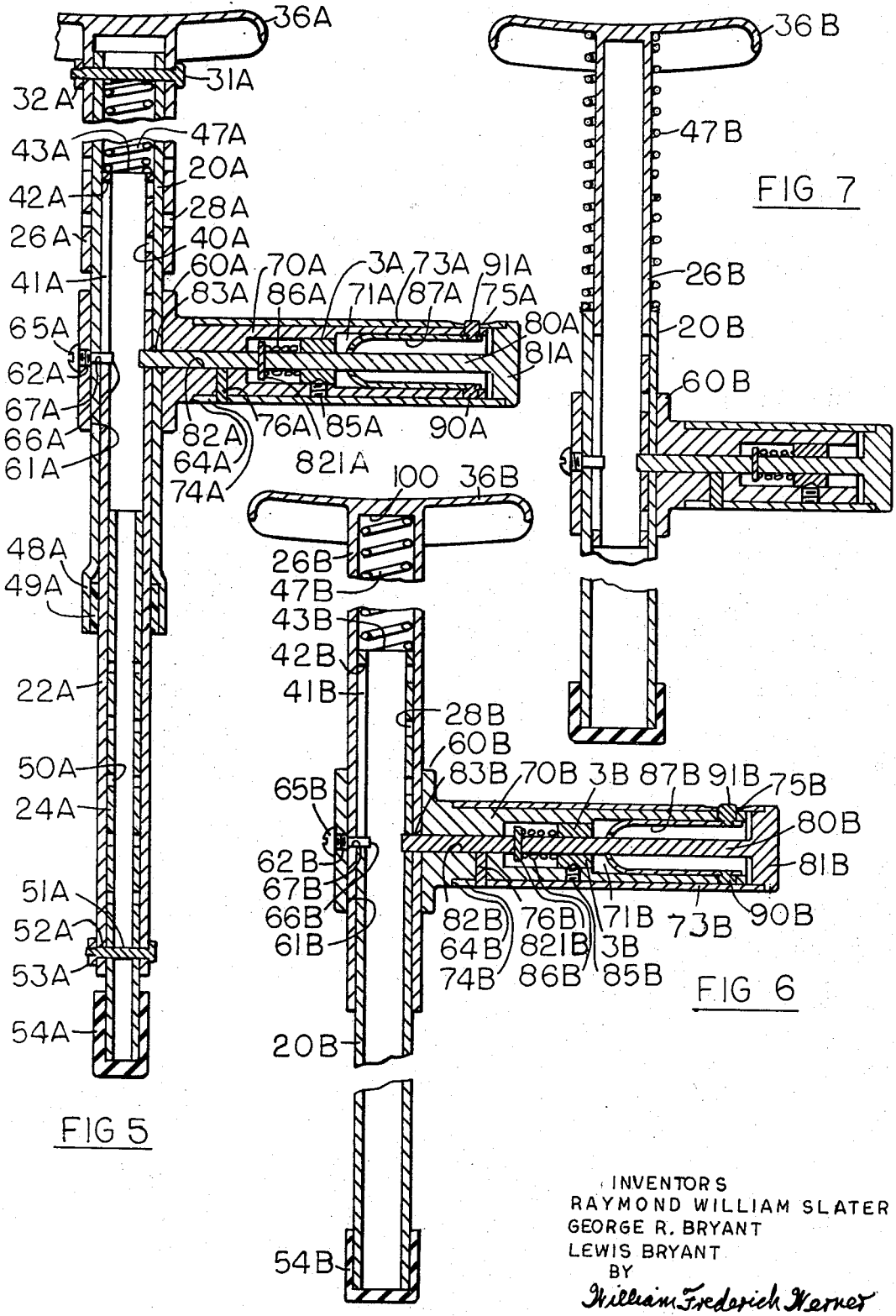

United States Patent Office
3,417,765
Patented Dec. 24, 1968

3,417,765
TELESCOPING AND LONGITUDINALLY ADJUSTABLE CRUTCH
Raymond William Slater, 164 Cottonwood St., West Island, Fairhaven, Mass. 02719; George R. Bryant, 122 Pollett St., Cumberland, R.I. 02864; and Lewis Bryant, 21 Williams St., Pawtucket, R.I. 02860
Filed Sept. 14, 1967, Ser. No. 667,733
4 Claims. (Cl. 135—50)

ABSTRACT OF THE DISCLOSURE

Telescoping and longitudinally adjustable crutch with swivel hand grip control of extensible spring.

This invention relates to crutches and more particularly to longitudinally adjustable telescoping crutches having spring actuated extensibility under swivel hand grip control with manual arm pit movement for compressing the spring and limiting telescoping extensibility.

This invention is an improvement over United States Patent No. 2,630,128, dated Mar. 3, 1953, by Raymond W. Slater for a Telescoping and Adjustable Crutch, which featured a pull out handle control for telescopic extensibility.

One of the objects of the present invention is to provide a telescoping crutch with a spring tension under control of a swivel handle, whereby turning of the handle releases the spring tension to longitudinally extend the telescoping parts under stop movement by an arm pit. In this manner a crutch can be lengthened for movement down steps and shortened for movement up steps under simultaneous action of an arm pit and handle movement.

Other objects of the present invention will be pointed out in part and become apparent in part in the following specification and claims.

Like reference numerals refer to like parts in the drawings, in which:

FIGURE 1 is a side elevational view of the new and improved telescoping and longitudinally adjustable crutch.

FIGURE 2 is a medial, vertical sectional view through FIGURE 1.

FIGURE 3 is a horizontal view partly in section, taken on line 3—3 of FIGURE 2.

FIGURE 4 is a view similar to FIGURE 3, taken on line 4—4 of FIGURE 2.

FIGURE 5 is a modified form of structure when compared with FIGURE 2.

FIGURE 6 is still another modified form of structure when compared with either FIGURE 2 or FIGURE 5.

FIGURE 7 is a view similar to FIGURE 6, but with the tubular body located within the tubular member.

Referring to the drawings, the improved crutch comprises a tubular member 20, an intermediate adjustable tubular member 22, a lower adjustable tubular member 24 and a tubular body 26.

The tubular body 26 is slidable upon the outside surface of tubular member 20 and is provided with a plurality of oppositely located selected orifices 28 which are selectively aligned with a bore 30 in tubular member 20. An upper stud 31 is passed through selected openings 28 and opening 30 to adjustably position tubular body 26 in relative position upon tubular member 20. A nut 32 fastens upper stud 31 in position.

An upper plug 33 provided with a shoulder 34 and an opening 35 is positioned within tubular member 20 with shoulder 34 abutting the end of tubular member 20. Opening 35 is aligned with bore 30 so as to be supported upon upper stud 31, for purposes which will presently appear.

An arm pit rest 36 provided with a circular projection 37 is secured to the upper end of upper tubular body 26 by means of a drive fit between the inside surface of circular projection 37 and the outside surface of tubular body 26.

Intermediate adjustable tubular member 22 is slidable within tubular member 20 and is provided with a series of openings 40 oppositely aligned with an elongated slot 41.

A lower plug 42 provided with a slot 43 which forms a stop wall 44 is inserted into the end of intermediate adjustable tubular member 22. A washer 45 fastened to upper plug 42 by means of screw 46 abuts the end of intermediate adjustable tubular member 22. A coil spring 47, or other resilient member, is interposed between upper plug 33 and lower plug 42 and is encased within tubular member 20. The lower end of tubular member 20 is flaired at 48 to accommodate a washer 49 which slidably engages the outside surface of intermediate adjustable tubular member 22. Washer 49 is fastened to tubular member 20 by means of a drive fit or welding. Washer 49 is employed to remove the looseness between the inside surface of lower end of tubular member 20 and the outside surface of intermediate adjustable tubular member 22. Because these telescoping tubes must support a handicapped person, looseness between telescoping members must be reduced to a minimum.

Lower adjustable tubular member 24 provided with a plurality of oppositely located selected openings 50 is slidably mounted within intermediate adjustable tubular member 22. By means of a lower stud 51 which passes through selected openings 50 and an opening 52 in intermediate adjustable tubular member 22, members 22, 24 are held in selected relative position. A nut 53 fastens lower stud 51 in position. A crutch tip 54 is fastened to the end of lower adjustable tubular member 24 by means of a drive fit.

It will be observed at this point in the specification that coil spring 47 would eject intermediate adjustable tubular member 22 out of engagement with tubular member 20. The mechanism about to be described prevents this result.

A handle mounting bracket 60 provided with a bore 61, a threaded orifice 62, a projection 63 and a shoulder 64 is slidably mounted upon the outside surface of tubular member 20 and is fastened in position by means of a set screw 65 rotatively mounted in threaded orifice 62 and provided with an extension 66 which engages an opening 67 in tubular member 20.

A handle support 70, provided with an axial passageway 71 throughout its length, is attached to projection 63 through a portion of axial passageway 71, abuts shoulder 64 and is fastened to handle mounting bracket 60, by means of lock pin 72.

A tubular cam actuator handle 73 provided with a cam surface 74 and a lock pin opening 75 is mounted upon handle support 70 for swivel type of rotary motion. A cam follower pin 76 fastened in projection 63 and handle support 70, engages the base of the cam surface 74, in locked position, as illustrated in FIGURES 2 and 4.

A latch pin 80 is slidably mounted in latch pin bearing 82 axially located in handle mounting bracket 60. A perforation 83 is provided in tubular member 20 to permit latch pin 80 to engage an opening 40, in intermediate adjustable tubular member 22, which is aligned with perforation 83. A latch pin cap 81 is provided with a shoulder 81A attached to latch pin 80 by means of a force fit. A snap washer 94 is fastened to an appropriate groove in latch pin 80 so as to insure that latch pin cap 81 will move with latch pin 80 under circumstances to be described.

A spring stop 821 located in axial passageway 71 is fastened to latch pin 80. A spring retainer 3 is slidably mounted upon latch pin 80 and is held in selected position within axial passageway 71 by means of a set screw 85 rotatively mounted in handle support 70. A coil spring 86 or other resilient element is interposed between spring stop 82 and spring retainer 3. A U-shaped spring 87 provided with a clearance opening so as to allow latch pin 80 to slide therethrough is provided with a knob 90 on one end which engages an opening in handle support 70 and with lock pin 91 on the other end which is slidably mounted in an opening 92 in handle support 70 and in lock pin opening 75. A cover 93 is held in a recess in latch pin cap 81 by means of a drive fit.

In operation, FIGURE 2 illustrates the crutch mechanism in position to support the weight of a handicapped person with arm pit rest 36 under the arm pit of a person. The handicapped person's hand will grip cam actuator handle 73 to be supported thereon.

Suppose for example the handicapped person wishes to step off a curb. He encounters the problem of his crutch being too short to reach the surface of the roadway below the sidewalk. He will first depress lock pin 91 and secondly he will swivel cam actuator handle 73 in a direction either toward himself or away from himself. This swivel motion will cause cam surface 74 to ride against cam follower pin 76 to move cam actuator handle 73 away from tubular member 20 and against the tension of coil spring 86 as cam actuator handle 73 through shoulder 81 of latch pin cap 81 withdraws latch pin 80 out of engagement with one of the openings 40. Simultaneously, with the disengagement of latch pin 80 from opening 40, coil spring 47 will eject intermediate adjustable tubular member 22 so that crutch tip 54 will engage the roadway. By releasing his grip upon cam actuator handle 73, spring 86 will force latch pin 80 into another of the series of openings 40 and swivel cam actuator handle 73 in a reverse direction; to the position shown in FIGURE 2. Spring 86 acting upon spring stop 821 and latch pin 80 will pull latch pin cap 81 and thereby cam actuator handle 73 to the position shown in FIGURES 2 and 4.

As the handicapped person steps off the sidewalk, over the curb, he again depresses lock pin 91 and swivels cam actuator handle 73 withdrawing latch pin 80 from an opening 40 as handle 73 engages shoulder 81A and compressing spring 86 and simultaneously he will use his arm pit to press down upon arm pit rest 36 to a comfortable walking position. By releasing his firm grip on the handle, spring 86 will again reset latch pin 80 into an opening 40 and cam actuator handle 73 will simultaneously return to original or starting position, as shown in FIGURE 2, as shoulder 81A acts upon handle 73.

It is obvious that lower stud can be removed and reset to change the relative position of lower adjustable tubular member 24 in relation to intermediate adjustable tubular member 22.

In like manner upper stud 31 can be removed and replaced to change the relative position of tubular body 26 in relation to tubular member 20 to lengthen and/or shorten the distance between arm pit rest 36 and crutch tip 54.

Referring to the modified form of structure illustrated in FIGURE 5, there is provided the tubular member 20A, the intermediate adjustable tubular member 22A, the lower adjustable tubular member 24A, and the tubular body 26A. As illustrated, arm pit rest 36A may be an integral part of tubular body 26A, or the arm pit rest may be fixed to the tubular body 26A, as shown and described for FIGURE 2.

The tubular body 26A is slidable upon the outside surface of tubular member 20A and is provided with a plurality of oppositely located selected orifices 28A which are selectively aligned with a bore 30A in tubular member 20A. An upper stud 31A is passed through selected orifices, 28A and bore 30A to adjustably position tubular body 26A in relative position upon tubular member 20A. A nut 32A fastens upper stud 31A in position. Upper stud 31A also serves the function of a spring stop as will presently be described.

Intermediate adjustable tubular member 22A is slidable within tubular member 20A and is provided with a series of openings 40A oppositely aligned with an elongated slot 41A. There is a stop wall 42A at one end of slot 41A.

A coil spring 47A is interposed between upper stud 31A and the end 43A of intermediate adjustable tubular member 22A. The lower end of tubular member 20A is flaired at 48A to accommodate a washer 49A which slidably engages the outside surface of intermediate adjustable tubular member 22A. Washer 49A is fastened to upper tubular member 20A by means of a drive fit or welding. Washer 49A is provided for the reasons previously stated in relation to FIGURE 2.

Lower adjustable tubular member 24A provided with a plurality of oppositely located selected openings 50A is slidably mounted within intermediate adjustable tubular member 22 by means of a lower stud 51A which passes through selected openings 50A and an opening 52A in intermediate adjustable tubular member 22. A nut 53A fastens lower stud 51A in position. A crutch tip 54A is fastened to the end of lower adjustable tubular member 24 by means of a drive fit.

A handle mounting bracket 60A provided with an integral handle support 70A, a bore 61A, a threaded orifice 62A and a shoulder 64A, is slidably mounted upon the outside surface of tubular member 20A and is fastened in position by means of a set screw 65A rotatively mounted in threaded orifice 62A. Set screw 65A is provided with an extension 66A which engages an opening 67A in tubular member 20A. Handle support 70A is provided with an axial passageway 71A.

A tubular cam actuator handle 73A provided with a cam surface 74A and a lock pin opening 75A is mounted upon handle support 70A for a swivel type of rotary motion. A cam follower pin 76A fastened in handle support 70A, engages the base of cam surface 74A in locked position, as described with reference to FIGURES 2 and 4.

A latch pin 80A provided with a latch pin cap 81A is slidably mounted in a latch pin bearing 82A axially located in handle mounting bracket 60A and in handle support 70A. A perforation 83A is provided in upper tubular member 20A to permit latch pin 80A to engage any of the openings 40A in intermediate adjustable tubular member 22A.

A spring stop 821A located in axial passageway 71A is fastened to latch pin 80A. A spring retainer 3A is slidably mounted upon latch pin 80A and is held in selected position within axial passageway 71A by means of a set screw 85A rotatively mounted in handle support 70A. A coil spring 86A is interposed between spring stop 821A and spring retainer 3A. A U-shaped spring 87A with a clearance opening so as to allow latch pin 80A to slide therethrough, is provided with knob 90A on one end, which engages an opening in handle support 70A and with a lock pin 91A on the other end, which is slidably mounted in opening 92A in handle support 70A and in lock pin opening 75A.

The structure just described in reference to FIGURE 5 functions in an identical manner to the structure illustrated in FIGURES 2, 3 and 4.

Reference is now made to the second modified form of structure illustrated in FIGURE 6. There is provided a tubular member 20B and an tubular body 26B provided with an arm pit rest 36B.

The tubular body 20B is slidable within tubular member 26B and is provided with a plurality of oppositely located selected openings 28B oppositely aligned with an elongated slot 41B. A stop wall 42B is provided at the end of slot 41B.

A spring seat 100 is provided in upper adjustable tubular member 26B. A coil spring 47B engages spring seat 100 with one end and abuts the end 43B of tubular member 20B. A crutch tip 54B may optionally be fastened to end of tubular member 20B.

A handle mounting bracket 60B provided with an integral handle support 70B, a bore 61B, a threaded orifice 62B, and a shoulder 64B, is slidably mounted upon the outside surface of tubular member 20B and is fastened in position by means of a set screw 65B rotatively mounted in threaded orifice 62B. Set screw 65B is provided with an extension 66B which engages an opening 67B in tubular body 20B. Handle support 70B is provided with an axial passageway 71B.

A tubular cam actuator handle 73B provided with a cam surface 74B and a lock pin opening 75B is mounted upon handle support 70B for a swivel type of rotary motion. A cam follower pin 76B fastened in handle support 70B, engages the base of cam surface 74B in locked position, as described with reference to FIGURES 2 and 4.

A latch pin 80B provided with a latch pin cap 81B is slidably mounted in a latch pin bearing 82B axially located in handle mounting bracket 60B and in handle support 70B. A perforation 83B is provided in tubular body 26B to permit latch pin 80B to engage any of the openings 28B.

A spring stop 821B located in axial passageway 71B is fastened to latch pin 80B. A spring retainer 3B is slidably mounted upon latch pin 80B and is held in position by means of a set screw 85B rotatively mounted in handle support 70B. A coil spring 86B is interposed between spring stop 821B and spring retainer 3B. A U-shaped spring 87B with a clearance opening so as to allow latch pin 80B to slide therethrough is provided with a knob 90B on one end, which engages an opening in handle support 70B and with a lock pin 91B on the other end, which is slidably mounted in opening 92B in handle support 70B and in lock pin opening 75B.

The structure just described with reference to FIGURE 6 functions in an identical manner to the structure illustrated in FIGURES 2, 3 and 4.

FIGURE 7 illustrates tubular body 26B slidably mounted within tubular member 20B and with handle mounting 60B fastened to tubular member 20B. Coil spring 47B surrounds tubular body 26B and is interposed between arm pit rest 36B and the end of tubular member 20B. In other respects the structure is the same as that shown in FIGURE 6.

Having shown and described a preferred embodiment of the present invention, by way of example, it should be realized that structural changes could be made and other examples given without departing from either the spirit or scope of this invention.

We claim:

1. A telescoping and longitudinally adjustable crutch comprising two tubes slidably related one within the other, a first resilient means interposed, between said two tubes, one tube having a plurality of openings the other tube having a perforation, said plurality of openings selectively alignable with said perforation, a handle mounting having a handle support, provided with an axial passageway, means fastening said handle mounting to one of said tubes, a second means limiting the movement of one tube in relation to the other tube under the influence of said first resilient means, a latch pin slidably mounted in said handle support and handle mounting, for sliding movement into and out of one of said plurality of openings aligned with said perforation, a spring retainer located in said axial passageway and fastened to said handle support, a spring stop fastened to said latch pin, a second resilient means interposed between said spring stop and said spring retainer, a spring means located in said axial passageway, means fastening one end of said spring means to said handle support, a cam actuator handle having a cam surface swivably mounted upon said handle support, a cam follower pin fastened in said handle support and in engagement with said cam surface, a lock pin fastened to the other end of said spring means, an opening in said handle support, an opening in said cam actuator handle aligned with said opening in said handle support, said lock pin projecting through said openings in said handle support and cam actuator handle, whereby pressing said lock pin against said spring means and out of said opening in said cam actuator handle permits swiveling of said cam actuator handle and cam surface against said cam follower pin to withdraw said latch pin from engagement with one of said plurality of openings and against the force of said second resilient means to release said two tubes to the action of said first resilient means, and reverse swiveling movement of said cam actuator handle releases said latch pin to the action of said second resilient means to position said latch pin in said perforation and one of said plurality of openings to hold one of said two tubes in selected position in relation to the other of said two tubes against the force of said first resilient means.

2. A telescoping and longitudinally adjustable crutch comprising a tubular body provided with a perforation, a tubular member provided with a series of openings, slidably mounted within said tubular body, resilient means between said tubular body and said tubular member to yieldingly urge said tubular member from engagement with said tubular body, stop means between said tubular body and tubular member limiting sliding movement therebetween, a handle mounting having a handle support, means fastening said handle mounting to said tubular body, a latch pin reciprocatingly mounted in said handle support, resilient means between said latch pin and handle support urging said latch pin into engagement with said perforation and one of said series of openings aligned with said perforation, a cam actuator handle swivably mounted upon said handle support, and cam means between said cam actuator handle and handle support, whereby manual swivable movement of said cam actuator handle withdraws said latch pin, from engagement with said one of a series of openings aligned with said perforation, against the resilience of said last mentioned resilient means to release said tubular member to the force of said first mentioned resilient means and manual release of said cam actuator handle releases said latch pin to the action of said second mentioned resilient means to cause engagement of said latch pin with another one of said series of openings to hold said tubular member in relative position in relation to said tubular body against the action of said first mentioned resilient means.

3. A telescoping and longitudinally adjustable crutch comprising a tubular body provided with an arm pit rest having a spring seat, a perforation and a first opening, a tubular member provided with a plurality of openings and an elongated slot having a stop wall, said tubular member slidably mounted within said tubular body, a coil spring located within said tubular body and interposed between said spring seat and the top of said tubular member, a handle mounting provided with a handle support, an axial bore, axial passageway and a latch pin bearing, said handle mounting, through said axial bore, slidably mounted upon said tubular body, a set screw having a projection, means rotatively mounting said set screw in said handle mounting with said projection engaging said first opening and said elongated slot to secure said handle mounting to said tubular body, said projection engageable with said stop wall to limit the relative movement of said tubular member and tubular body under the influence of said coil spring, a latch pin slidable mounted in said latch pin bearing, a spring retainer located in said axial passageway and fastened to said handle support, a spring stop fastened to said latch pin, resilient means interposed between said spring stop and spring retainer, spring means in said axial passageway, means fastening one end of said spring means to said handle support, a cam actuator handle, having a cam surface, swivably mounted upon said handle support, a cam follower pin fastened in said handle support and in engagement with said cam surface, a lock pin fastened to the other end of said spring means, openings in said handle support and cam actuator handle, said lock pin projecting through said openings, whereby depressing said lock pin against said spring means permits swiveling of said cam actuator handle and cam surface against said cam follower pin to withdraw said latch pin from engagement with one of said plurality of openings aligned with said perforation and against the force of said resilient means to release said tubular member to the action of said coil spring, and reverse swiveling movement of said cam actuator handle releases said latch pin to the action of said resilient means to position said latch pin in said perforation and one of said plurality of openings to hold said tubular member in selected position in relation to said tubular body against the force of said coil spring, said lock pin holding said cam actuator handle in selected fixed position.

4. A telescoping and longitudinally adjustable crutch comprising a tubular member provided with a perforation and a first opening, an intermediate adjustable tubular member, having a plurality of openings and an elongated slot slidably mounted in relative position to said tubular member, an upper plug fastened to said tubular member, a lower plug having a stop wall fastened to said lower adjustable tubular member, a resilient interposed between said upper plug and said lower plug, a tubular body, provided with an arm pit rest and a plurality of orifices, slidably mounted in relative position to said tubular member, means removably securing said tubular body to said tubular member and said upper plug, a lower adjustable tubular member, having a series of openings, slidably mounted in relative position to said intermediate adjustable tubular member, means removably securing said lower adjustable tubular member to said intermediate adjustable tubular member, a handle mounting having a projection, means fastening said handle mounting to said tubular member, a set screw having a projection, means rotatively securing said set screw in said handle mounting with said projection engaging said first opening and said elongated slot, and adapted to engage said stop wall, a handle support, having an axial passageway, means fastening said handle support to said projection, a latch pin, means slidably mounting said latch pin in said handle support, perforation and one selected orifice of said plurality of orifices, a spring retainer located in said axial passageway and fastened to said handle support, a spring stop fastened to said latch pin, resilient means interposed between said spring stop and spring retainer, spring means in said axial passageway, means fastening one end of said spring means to said handle support, a cam actuator handle, having a cam surface, swivably mounted upon said handle support, a cam follower pin fastened in said handle support and in engagement with said cam surface, a lock pin fastened to the other end of said spring means, openings in said handle support and cam actuator handle, said lock pin projecting through said openings, whereby depressing said lock pin against said spring means permits swiveling of said cam actuator handle.

References Cited
UNITED STATES PATENTS

| | | | |
|---|---|---|---|
| 2,474,722 | 6/1949 | Blume | 135—50 |
| 2,590,607 | 3/1952 | Grimball | 135—50 |
| 2,630,128 | 3/1953 | Slater | 135—50 |
| 2,674,253 | 4/1954 | Hopkins | 135—50 |
| 3,289,685 | 12/1966 | Parker | 135—50 |

PETER M. CAUN, *Primary Examiner.*

U.S. Cl. X.R.

135—51